(12) United States Patent
Zhang et al.

(10) Patent No.: US 11,958,140 B2
(45) Date of Patent: Apr. 16, 2024

(54) ALUMINUM WELDING ALLOYS WITH IMPROVED PERFORMANCE

(71) Applicant: General Cable Technologies Corporation, Highland Heights, KY (US)

(72) Inventors: Shenjia Zhang, Zionsville, IN (US); Janusz Stanislaw Sekunda, Williamsport, PA (US); Jean Bilodeau, Jonquiere (CA)

(73) Assignee: General Cable Technologies Corporation, Highland Heights, KY (US)

( * ) Notice: Subject to any disclaimer, the term of this patent is extended or adjusted under 35 U.S.C. 154(b) by 383 days.

(21) Appl. No.: 16/409,519

(22) Filed: May 10, 2019

(65) Prior Publication Data

US 2020/0353573 A1  Nov. 12, 2020

(51) Int. Cl.
*B23K 35/28* (2006.01)
*B23K 35/02* (2006.01)
*C22C 21/08* (2006.01)

(52) U.S. Cl.
CPC ........ *B23K 35/288* (2013.01); *B23K 35/0261* (2013.01); *C22C 21/08* (2013.01)

(58) Field of Classification Search
CPC .................................................. B23K 35/288
See application file for complete search history.

(56) References Cited

U.S. PATENT DOCUMENTS

| 5,597,529 A | 1/1997 | Tack | |
|---|---|---|---|
| 2002/0006352 A1 | 1/2002 | Spanjers et al. | |
| 2010/0129683 A1* | 5/2010 | Lin ..................... | B23K 35/288 |
| | | | 428/654 |

FOREIGN PATENT DOCUMENTS

| CN | 101597708 A | 12/2009 |
|---|---|---|
| CN | 101649405 A | 2/2010 |
| CN | 103060636 A | 4/2013 |
| CN | 104775062 A | 7/2015 |
| CN | 105441744 A | 3/2016 |
| CN | 106702229 A | 5/2017 |
| CN | 107214432 A | 9/2017 |
| CN | 107739918 A | 2/2018 |
| CN | 108642346 A | 10/2018 |
| EP | 3305926 A1 | 4/2018 |
| ES | 2373054 T3 | 1/2012 |
| FR | 2838135 B1 | 1/2005 |
| RU | 2163939 C1 | 3/2001 |
| WO | 00/66800 A1 | 11/2000 |
| WO | 2005047554 A1 | 5/2005 |
| WO | 2007020041 A2 | 2/2007 |

OTHER PUBLICATIONS

Rosciano, Fabio; Extended European Search Report issued in European Patent Application No. 20173228.6; dated Jul. 23, 2020; 11 pages.
Ahmad, Zaki; The Properties and Application of Scandium-Reinforced Aluminum; JOM, Feb. 2003; pp. 35-39.
Lathabai, S. et al.; The effect of scandium on the microstructure, mechanical properties and weldability of cast Al—Mg alloy; Jun. 10, 2002; Acta Materialia 50 (2002); pp. 4275-4292.
Halap, Akram et al.; Study of Homogenization Treatments of Cast 5xxx Series Al—Mg—Mn Alloy Modified with Zn; Light Metals 2012; The Minerals, Metals & Materials Society; pp. 387-388.
Royset, Jostein; Scandium in Aluminum Alloys Overview: Physical Metallurgy, Properties and Applications; Metallurgical Science and Technology; vol. 25, No. 2, 2007; pp. 11-21 and abstract.
Wang; Y et al.; Influence of alloyed Nd content on the corrosion of an Al-5Mg alloy; accepted Mar. 29, 2013; Corrosion Science 73 (2013); pp. 181-187.
Zahkarov, V. V.; Effect of Scandium on the Structure and Properties of Aluminum Alloys; Metal Science and Heat Treatment, vol. 45, Nos. 7-8, 2003; pp. 246-253.
Kaibyshev, Rustam et al.; Cost-Affordable Technique Involving Equal Channel Angular Pressing for the Manufacturing of Ultrafine Grained Sheets of an Al—Li—Mg—Sc Alloy; Advanced Engineering Materials 2010; vol. 12, No. 8; 735-739.
Al-Anazi, Ohoud Matar Jamaan; Second Office Action issued in GC Patent Application No. 2020-39707; Nov. 18, 2021; 3 pages.
Rosciano, Fabio; Office Action issued in European Patent Application No. 20173228.6; Sep. 23, 2021; 5 bages.
Al-Anazi, Ohoud Matar Jamaan; Office Action issued in GC Patent Application No. 2020-39707; Aug. 16, 2021; 6 pages.

* cited by examiner

*Primary Examiner* — Scott R Kastler
(74) *Attorney, Agent, or Firm* — Frost Brown Todd LLP

(57) ABSTRACT

Aluminum welding alloys with improved welding performance are disclosed. The aluminum welding alloys include high loading levels of magnesium and one or more surface active elements and arc stabilizer elements. Methods of making and using the aluminum welding alloys are further disclosed.

13 Claims, No Drawings

ALUMINUM WELDING ALLOYS WITH IMPROVED PERFORMANCE

TECHNICAL FIELD

The present disclosure generally relates to aluminum welding alloys exhibiting improved performance.

BACKGROUND

It is useful to weld metals together for the construction of various articles and structures. In typical welding processes, surfaces of articles can be joined together utilizing a welding tool which applies energy to melt the surfaces as well as a welding alloy dispersed between the surfaces to form a joint. Welding alloys are selected based on various properties such as their compatibility with the base material, their mechanical strength, and their efficiency during use. Typically, welding alloys are formed of the same, or similar, base metal as the material to be welded but can also have different formulations to enhance their use or properties. Although magnesium-containing aluminum alloys are useful for their high strength, utilizing such aluminum alloys for welding purposes can lead to various issues and fail to provide the desired benefits.

PCT Patent App. Pub. No. WO 2007/020041 describes an aluminum alloy product having high strength, excellent corrosion resistance and weldability, having the following composition in wt. %:—Mg 3.5 to 6.0 Mn 0.4 to 1.2 Fe<0.5 Si<0.5 Cu<0.15 Zr<0.5 Cr<0.3 Ti 0.03 to 0.2 Sc<0.5 Zn<1.7 Li<0.5 Ag<0.4, optionally one or more of the following dispersoid forming elements selected from the group consisting of erbium, yttrium, hafnium, vanadium, each <0.5 wt %, and impurities or incidental elements each <0.05, total <0.15 and the balance being aluminum.

Chinese Patent CN 101649405B describes a weldable Al—Mg—Mn—Zr—Sr alloy with high intensity and high toughness containing strontium. The preparation method is as follows: batching according the weight percentage of the components; then heating up to 820 to 850 degrees centigrade, when melting completely, reducing the temperature, standing, using C2C16 to refine, then casting into a preheating mold; after treating ingot casting uniformly, heating up, and extruding for deformation, the extruding ratio is 12. The invention has a rational component proportion, easy processing and production, simple operational technique; by means of alloying by using Sr element, it effectively improves the organizational structure of the Al alloy, and improves the comprehensive mechanical property of the Al alloy; the invention is suitable for industrial application, and provides an operable way for improving the comprehensive mechanical property of the weldable Al alloy with high intensity in the Al—Mg—Mn—Zr—Sr system.

PCT Patent App. Pub. No. WO 2000/066800 describes an aluminum-magnesium alloy product for welded mechanical construction, having the following composition, in weight percent: Mg 3.5-6.0, Mn 0.4-1.2, Zn 0.4-1.5, Zr 0.25 max., Cr 0.3 max., Ti 0.2 max., Fe 0.5 max., Si 0.5 max., Cu 0.4 max., one or more selected from the group: Bi 0.005-0.1, Pb 0.005-0.1, Sn 0.01-0.1, Ag 0.01-0.5, Sc 0.01-0.5, Li 0.01-0.5, V 0.01-0.3, Ce 0.01-0.3, Y 0.01-0.3, Ni 0.01-0.3, others (each) 0.05 max., (total) 0.15 max., balance aluminum.

SUMMARY

In accordance with one embodiment, an aluminum welding alloy includes about 2.4% or more, by weight, magnesium; about 0.25% or less, by weight, zinc; and about 0.01% to about 1.5%, by weight, of one or more surface active elements and arc stabilizer elements; and the balance is aluminum. The aluminum welding alloy is substantially free of zirconium.

In accordance with another embodiment, a welding process includes forming a joint between two or more articles, applying energy and an aluminum welding alloy to the joint, and cooling the joint. The aluminum welding alloy includes about 2.4% or more, by weight, magnesium; about 0.25% or less, by weight, zinc; and about 0.01% to about 1.5%, by weight, of one or more surface active elements and arc stabilizer elements; and the balance is aluminum. The aluminum welding alloy is substantially free of zirconium.

DETAILED DESCRIPTION

Although useful for their high strength, welding of magnesium-containing aluminum alloys suffer from various issues. For example, known magnesium-containing aluminum welding alloys exhibit poor welding efficiency, a high generation of spatter and smut, low puddle fluidity, and unstable arcing. Improved magnesium-containing aluminum welding alloys as described below have been discovered to provide enhanced benefits over conventional magnesium-containing aluminum welding alloys. The improved welding alloys are formed through the inclusion of one or more surface active elements, which improve spatter and weld pool fluidity, and arc stabilizer elements, which improve stability and current flow of the welding arc.

As used herein, spatter refers to undesirable droplets of molten material which are lost during a welding process. As used herein, smut refers to undesirable byproduct formed during a welding process. As used herein, puddle fluidity refers to the fluidity of the molten puddle formed during the welding process. Puddle fluidity is indicated by a low toe angle and a less convex bead shape. A puddle with low fluidity (high toe angle and more convex bead) will be reluctant to flow with the arc and to wet the base plate. As used herein, arc stability refers to the absence of any loss-of-stability events such as when the welding arc dissipates or stutters.

Generally, the surface active elements and/or arc stabilizer elements can be included in any magnesium-containing aluminum alloy. For example, the improved welding alloys described herein can include about 2.4% or more, by weight, magnesium. In certain embodiments, the magnesium content of the improved welding alloys can be about 3% or more, by weight; about 3.5% or more, by weight; about 4% or more, by weight, about 4% to about 7%, by weight, or about 4.5% to about 7% by weight. Without being bound by theory, it is theorized that improved welding alloys including larger quantities of magnesium, such as about 4% to about 7%, by weight, magnesium, can exhibit better welding performance than similar aluminum alloys including relatively smaller quantities of magnesium.

It has been presently discovered that inclusion of surface active elements and/or arc stabilizer elements can facilitate the formation of an aluminum welding alloy with improved performance.

As can be appreciated, the term surface active elements can refer to elements which migrate to the surface in an alloy system. Suitable surface active elements for the aluminum welding alloys described herein can include elements which improve the surface of the molten welding alloy such as those elements which exhibit a lower vapor pressure than magnesium at welding temperatures (e.g., at about 1000° C.

to about 1600° C.). Such elements include calcium, beryllium, and strontium. As can be appreciated, inclusion of elements with such vapor pressures can lower the propensity of the alloy to generate spatter and localized boiling by lowering the overall vapor pressure of the molten alloy within the welding temperature range. In certain embodiments, beryllium can be undesirable as it is a known carcinogen and can be a prohibited element in welding alloys.

In certain embodiments, the improved welding alloys can include about 0.01% to about 0.5%, by weight, of the surface active elements including any quantities between about 0.01% to about 0.5%, by weight, including about 0.02% to about 0.1%, by weight, and about 0.02% to about 0.075%, by weight. In certain embodiments, it can be useful to limit the loading level of surface active elements in the improved welding alloys described herein to a loading level of about 0.50% or less. Loading levels of greater than 0.50% can increase the total vapor pressure during welding and increase the weld metal's susceptibility to gas porosity. As can be appreciated, both such effects are detrimental to welding operations and welding performance.

The improved welding alloys can alternatively, or additionally, include arc stabilizer elements. Arc stabilizer elements refer to elements which are easily ionized and have lower first ionization potentials than aluminum. As can be appreciated, the increased ionization of such elements can augment both the arc current and the arc stability during welding. Generally, arc stabilizer elements which exhibit such properties can include rare earth metals such as the metals from the lanthanide series of elements including lanthanum, cerium, praseodymium, neodymium, promethium, samarium, and europium. Erbium is not a suitable arc stabilizer element as it exhibits a higher first ionization potential than aluminum. Particular examples of suitable arc stabilizer elements include cerium and lanthanum.

In certain embodiments, the improved welding alloys can include about 0.01% to about 1%, by weight, of the arc stabilizer elements including any quantities between about 0.01% to about 1%, by weight, such as about 0.1% to about 0.75%, by weight, of the arc stabilizer elements. In certain embodiments, it can be useful to include a combination of more than one arc stabilizer element such as a combination of cerium and lanthanum.

In certain embodiments, the improved welding alloys described herein can include both surface active elements and arc stabilizer elements. For example, in certain embodiments, the improved welding alloys can include calcium, cerium, and lanthanum to improve each of spatter, puddle fluidity, and arc stability. In certain embodiments, improvements to spatter and puddle fluidity from inclusion of only surface active elements have also been found to improve arc stability.

As can be appreciated, a number of aluminum alloy grades have been standardized by the Accrediting Standards Committee H35 of the Aluminum Association. Standardized aluminum grades are defined by their elemental compositions with the various grades generally intended for specific applications and industries. Specific aluminum alloys of interest were published by the Aluminum Association in January 2015 in the "International Alloy Designations and Chemical Composition Limits for Wrought Aluminum and Wrought Aluminum Alloys" including 5000-series aluminum alloys. 5000-series aluminum alloys are magnesium-containing aluminum alloys which are useful to form structural articles and provide reinforcement due to the strength imparted by inclusion of high loading quantities of magnesium. Certain aluminum grades are also defined by the American Welding Society ("AWS") for electric arc welding application in AWS A5.10 (2017) including 5183 aluminum alloy, 5556 aluminum alloy, and 5554 aluminum alloy.

In certain embodiments, the improved welding alloys described herein can be formed by modification of known 5000-series aluminum alloys including, for example, AA5356 aluminum alloy. In such embodiments, surface active elements and/or arc stabilizer elements can be added to a previously cast 5000-series aluminum alloy or can be added during initial formation of the 5000-series aluminum alloy.

Examples of suitable aluminum alloys can include varying amounts of magnesium, manganese, as well as other elements, to achieve the targeted balance of weldability, welding performance, and mechanical properties. As can be appreciated, standardized AWS grades with higher magnesium content, such as ER5183 and ER5356, can exhibit higher tensile strength but worse welding performance than grades with lower magnesium content, such as ER5554. Inclusion of surface active elements and arc stabilizing elements can improve the welding performance of all grades of aluminum magnesium alloys in AWS A5.10 (2017) and can particularly benefit ER5356, ER5183, and ER5556, which each have higher amounts of magnesium.

ER5356 aluminum alloys or AA5356 aluminum alloys are defined by AWS A5.10 (2017) or alternatively defined by unified number system ("UNS") AA5356 standard and include, by weight, 0.40% or less iron, 0.25% or less silicon, 0.10% or less copper, 0.05% to 0.20% manganese, 4.5% to 5.5% magnesium, 0.05% to 0.20% chromium, 0.10% or less zinc, 0.06% to 0.20% titanium, 0.0003% or less beryllium, 0.05% or less each other element with a total of less than 0.15% of each other element, and the remainder aluminum.

ER5183 aluminum alloys defined by AWS A5.10 (2017) include, by weight, 0.40% or less, iron, 0.40%, or less, silicon, 0.10%, or less, copper, 0.50% to 1.0% manganese, 4.3% to 5.2%, magnesium, 0.05% to 0.25% chromium, 0.25%, or less, zinc, 0.15%, or less, titanium, 0.0003%, or less, beryllium, 0.05% or less each other element with a total of less than 0.15% of each other element, and the remainder aluminum.

ER5554 aluminum alloys defined by AWS A5.10 (2017) include, by weight, 0.40% or less, iron, 0.25%, or less, silicon, 0.10%, or less, copper, 0.50% to 1.0% manganese, 2.4% to 3.0%, magnesium, 0.05% to 0.20% chromium, 0.25%, or less, zinc, 0.05% to 0.20% titanium, 0.0003% or less beryllium, 0.05% or less each other element with a total of less than 0.15% of each other element, and the remainder aluminum.

ER5556 aluminum alloys defined by AWS A5.10 (2017) include, by weight, 0.40% or less, iron, 0.25%, or less, silicon, 0.10%, or less, copper, 0.50% to 1.0% manganese, 4.'7% to 5.5%, magnesium, 0.05% to 0.20% chromium, 0.25%, or less, zinc, 0.05% to 0.20% titanium, 0.0003% or less beryllium, 0.05% or less each other element with a total of less than 0.15% of each other element, and the remainder aluminum.

ER5654 aluminum alloys defined by AWS A5.10 (2017) include, by weight, 0.45% or less, of iron and silicon combined, 0.05%, or less, copper, 0.01%, or less, manganese, 3.1% to 3.9%, magnesium, 0.15% to 0.35% chromium, 0.20%, or less, zinc, 0.05% to 0.15% titanium, 0.0003% or less beryllium, 0.05% or less each other element with a total of less than 0.15% of each other element, and the remainder aluminum.

Certain improved welding alloys described herein can satisfy the requirements of standardized aluminum alloy grades such as when the loading quantities of the surface active elements and arc stabilizer elements remain within the elemental limits of defined aluminum alloy grades.

In certain embodiments, the aluminum mechanical alloys described herein can alternatively be similar to 5000-series aluminum alloys but be formed with higher loading levels of surface active elements or arc stabilizer elements such as calcium, strontium, cerium, and lanthanum. As can be appreciated, 5000-series aluminum alloys allow only 0.05%, by weight, of incidental elements with a total of 0.15%, by weight, of all of the incidental elements.

In certain embodiments, aluminum welding alloys described herein can retain the strength of 5000-series aluminum alloys due to the retention of high magnesium loading levels. Such high strength makes the improved welding alloys described herein particularly useful as a welding alloy for any welding operation welding a high strength aluminum alloy such as a 5000-series aluminum alloy.

In certain embodiments, the improved welding alloys can include, by weight, about 0.4% or less silicon, such as about 0.4% to about 0.01% silicon. In certain embodiments, the improved welding alloys can include, by weight, about 0.2% to about 0.04% silicon; about 0.15% to about 0.05% silicon; or about 0.08% to about 0.05% silicon.

In certain embodiments, the improved welding alloys can include, by weight, about 0.7% or less iron, such as about 0.7% to about 0.10% iron or any range between about 0.7% to about 0.1% iron including about 0.10% iron to about 0.35% iron and about 0.15% to about 0.20% iron.

In certain embodiments, the improved welding alloys can include, by weight, about 0.10% or less copper including 0.05% or less copper, about 0.04% or less copper, about 0.001% to about 0.035% copper; about 0.001% to about 0.03% copper; and about 0.01% to about 0.25% copper.

In certain embodiments, about 1.0%, by weight, or less manganese can be included in the improved welding alloys. For example, in certain embodiments, the improved welding alloys can include, by weight, about 1.0% to about 0.5% manganese, about 0.25% to about 0.10% manganese, about 0.25% to about 0.15% manganese, or 0.01% or less manganese.

In certain embodiments, the improved welding alloys can include, by weight, about 0.20% or less chromium including, for example, about 0.18% to about 0.05% chromium, about 0.15% to about 0.05% chromium, and about 0.15% to about 0.10% chromium.

In certain embodiments, the improved welding alloys can include about 0.25% or less zinc. For example, in certain embodiments, the improved welding alloys can include, by weight, about 0.25% to about 0.001% zinc, about 0.20% to about 0.002% zinc, about 0.15% to about 0.005% zinc, about 0.10% to about 0.01% zinc, about 0.05% to about 0.001% zinc, about 0.04% to about 0.003% zinc, or about 0.035% to about 0.01% zinc.

In certain embodiments, titanium can be included in the improved welding alloys described herein at about 0.2%, by weight, or less. For example, titanium can be included in certain embodiments at about 0.15%, by weight, to about 0.05%, by weight including at about 0.10%, by weight, to about 0.075%, by weight.

Boron can be included in the improved welding alloys at about 0.01%, by weight, or less. For example, in certain embodiments, the improved welding alloys can include about 0.0050%, by weight, or less boron. In certain embodiments, the improved welding alloys can be substantially free of any boron. As used herein, "substantially free of" means that the component is included at about 0.001% or less by weight or is present only as an unavoidable contaminant.

In certain embodiments, the improved welding alloys described herein can include about 0.05%, by weight, or less of each incidental element and a total of 0.15%, by weight, or less of all incidental elements such as zirconium or beryllium. In certain embodiments, the incidental elements can be the incidental elements of the 5000-series aluminum alloys with the exception of the surface active elements and the arc stabilizer elements. In certain embodiments, the improved welding alloys can be substantially free of one or more of zirconium, beryllium, and neodymium.

In certain embodiments, the improved welding alloys described herein can include, by weight, about 0.4% or less silicon; about 0.7%, or less iron; about 0.4%, or less, copper; about 0.05% to about 0.3%, manganese; about 3.1% to about 7%, magnesium; about 0.05% to about 0.20%, chromium; about 0.1%, or less, zinc; about 0.2%, or less, titanium; about 0.01% to about 0.5%, or one or more of calcium and strontium, or about 0.01% to about 1% of one or more of cerium and lanthanum; about 0.05%, or less individually, or about 0.15% collectively, of impurities or incidental elements; and remainder aluminum.

In certain embodiments, the improved welding alloys described herein can include, by weight, about 0.25% or less silicon; about 0.74, or less iron; about 0.2%, or less, copper; about 0.05% to about 0.3%, manganese; about 2.4% to about 7%, magnesium; about 0.05% to about 0.20%, chromium; about 0.25%, or less, zinc; about 0.2%, or less, titanium; about 0.01% to about 0.5%, or one or more of calcium and strontium, or about 0.01% to about 1% of one or more of cerium and lanthanum; about 0.05%, or less individually, or about 0.15% collectively, of impurities or incidental elements; and remainder aluminum.

Generally, the aluminum alloys described herein can be formed as known in the art. For example, substantially pure aluminum can be melted at a temperature of about 537° C. to 704° C. (1000° F. to about 1300° F.) and then additional elements such as magnesium, iron, silicon, calcium, strontium, cerium, and lanthanum can be added in accordance to their desired weight percentage. In certain embodiments, certain elements can optionally be added using a grain refiner to further control microcrystalline structure. Once all of the elements are present in accordance to their desired weight percentage, the molten aluminum mixture can be cast to form an aluminum welding alloy as described herein. Alternatively, an existing aluminum alloy can be melted and additional elements can be incorporated.

In certain embodiments, further processing, such as cold wire drawing, can be performed to further improve the grain structure as known in the art. As can be appreciated, cold wire drawing is a process which pulls a non-elevated temperature (e.g., room temperature) wire through a die to improve the microcrystalline structure and properties. In certain embodiments, the improved welding alloy can be further formed into a welding wire or welding electrode.

As can be appreciated, many variations to the process of casting an aluminum alloy are known. For example, various stirring steps can be performed on a molten aluminum mixture to improve homogeneity. Additionally, or alternatively, a molten aluminum mixture can be allowed to settle for a period of time to allow unwanted inclusion particles to be deposited as sediment and be removed. In certain embodiment, a molten aluminum mixture can also be refined to remove impurities using, for example, alloying constituents and precise temperature control to precipitate undesired impurities out of the molten mixture.

EXAMPLES

Several examples of aluminum alloys were formed as welding electrodes to evaluate improvements to welding performance caused by the inclusion of surface active elements or arc stabilizers. Example 1 is an AA5356 aluminum alloy and serves as a comparative control. Example 2 is an AA5356 aluminum alloy incorporating about 0.045%, by weight, calcium. Example 3 is an AA5356 aluminum alloy incorporating about 0.02%, by weight, calcium. Example 4 is an AA5356 aluminum alloy incorporating about 0.06%, by weight, calcium. Example 5 is an AA5356 aluminum alloy incorporating about 0.50%, by weight, calcium. Example 6 is an AA5356 aluminum alloy incorporating about 0.05%, by weight, cerium and about 0.05%, by weight, lanthanum. Example 7 is an AA5356 aluminum alloy incorporating both surface active elements and arc stabilizers. Example 7 includes about 0.045%, by weight, calcium, about 0.40%, by weight, cerium, and about 0.35%, by weight, lanthanum.

TABLE 1

|         | Ex. 1   | Ex. 2   | Ex. 3   | Ex. 4   | Ex. 5   | Ex. 6    | Ex. 7   |
|---------|---------|---------|---------|---------|---------|----------|---------|
| Si (%)  | 0.049   | 0.061   | 0.07098 | 0.08407 | 0.0672  | 0.150993 | 0.06688 |
| Fe (%)  | 0.098   | 0.129   | 0.18598 | 0.18951 | 0.16275 | 0.18203  | 0.35213 |
| Cu (%)  | 0.001   | 0.003   | 0.01183 | 0.01789 | 0.02549 | 0.023248 | 0.03359 |
| Mn (%)  | 0.154   | 0.144   | 0.24877 | 0.23533 | 0.25315 | 0.177143 | 0.24433 |
| Mg (%)  | 4.58    | 4.629   | 4.65934 | 4.4016  | 4.31245 | 4.18118  | 4.57707 |
| Cr (%)  | 0.122   | 0.16    | 0.11046 | 0.13688 | 0.06225 | 0.064185 | 0.07666 |
| Zn (%)  | 0.003   | 0.005   | 0.03315 | 0.03732 | 0.02339 | 0.01097  | 0.04571 |
| Ti (%)  | 0.093   | 0.074   | 0.07547 | 0.10645 | 0.05024 | 0.08972  | 0.05854 |
| B (%)   | 0.0050  | 0.0003  | 0.0026  | 0.0019  | 0.0012  | 0.0000   | 0.0013  |
| Be (%)  | 0.0000  | 0.0000  | 0.0000  | 0.0000  | 0.0000  | 0.0018   | 0.0000  |
| Ca (%)  | 0.001   | 0.043   | 0.017   | 0.064   | 0.500   | 0.001    | 0.045   |
| Ce (%)  | 0.000   | 0.000   | 0.000   | 0.000   | 0.000   | 0.060    | 0.400   |
| La (%)  | 0.000   | 0.000   | 0.000   | 0.000   | 0.000   | 0.040    | 0.350   |
| Al      | Balance | Balance | Balance | Balance | Balance | Balance  | Balance |

Examples 1 to 7 were evaluated for welding performance by welding AA6061 ⅜" (9.5 mm) aluminum plates at the, flat, 1F position. The welder used was a Millermatic 350P Inverter Arc Welder using a Miller Spoolmatic 30 A spool gun (both available from Miller Electric Manufacturing Co. of Appleton, WI). The welder was operated using a direct current positive electrode at a voltage of 23 volts to 23.8 volts using argon as the shielding gas. The deposition rate was 2.04 kg/hour to 2.95 kg/hour (4.5 lbs/hour to 6.5 lbs/hour).

Each of examples 1 to 7 were evaluated for the generation of smut, spatter, puddle fluidity, and arc stability by two welding technicians with each technician provided a subjective score of performance for each measure. Table 2 depicts the average score of the two technicians on a 1 to 5 scale with a score of 5 indicating excellence and a score of 1 indicating poor performance. Spatter was evaluated by comparing the weight percentage of spatter formed during welding with each of the example welding alloys with less spatter being rated higher. Puddle fluidity was determined by comparing the toe angle and bead convexity of a molten puddle formed with each of the example welding alloys. An example welding alloy was rated higher if the molten puddle exhibited a lower toe angle and a less convex bead. Arc stability was measured by observing the frequency of loss-of-stability events were the welding arc disengaged or stuttered. Example alloys were rated highly if they exhibited few, if any, loss-of-stability events.

Examples 1, 2, 3, 5, and 7 were further evaluated for welding efficiency and spatter weight percentage. Welding efficiency and spatter weight percentage refer to the amount of welding alloy incorporated into the joint or lost as spatter respectively. Welding efficiency and spatter weight percentage were measured by determining the weight of applied welding alloy by multiplying the welding time with the wire feed rate in kg/hour and then comparing this weight to the change in the weight of the base plate.

TABLE 2

| Ex. | Smut | Spatter | Puddle Fluidity | Arc Stability | Welding Efficiency (wt. %) | Spatter (wt. %) |
|-----|------|---------|-----------------|---------------|----------------------------|-----------------|
| 1   | 3    | 1       | 3               | 3             | 81.1                       | 18.9            |
| 2   | 3    | 5       | 4               | 4             | 86.4                       | 13.6            |
| 3   | 3    | 5       | 5               | 5             | 88.3                       | 11.7            |
| 4   | 3    | 4       | 4               | 4             | —                          | —               |
| 5   | 3    | 1       | 3               | 2             | 78.1                       | 21.9            |
| 6   | 3    | 4       | 4               | 5             | —                          | —               |
| 7   | 3    | 4       | 5               | 3             | 85.3                       | 14.7            |

As depicted in Table 2, the incorporation of small amounts of either surface active elements (Calcium) or arc stabilizer elements (Cerium and Lanthanum) improved the welding performance of examples 2 to 4, and 6 to 7 as demonstrated by improved subjective evaluations and improved welding efficiency.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of ordinary skill in the art. Rather it is hereby intended the scope be defined by the claims appended various embodiments. The scope is, of course, not limited to the examples or embodiments set forth herein, but can be employed in any number of applications and equivalent articles by those of hereto.

What is claimed is:

1. An aluminum welding alloy comprising:
    about 2.4% to 4.7%, by weight, magnesium;
    about 0.25% or less, by weight, zinc;
    about 0.4% or less, silicon;
    about 0.7% or less, iron;
    about 0.4% or less, copper;
    about 0.05% to about 0.20% chromium;
    about 0.2% or less, titanium;
    about 0.01% to about 0.1%, by weight, calcium and/or
        about 0.01% to about 1.5%, by weight, strontium as one or more surface active elements;
    optionally about 0.01 to about 1.5%, by weight, of one or more arc stabilizer elements; and
    the balance is aluminum; and
    wherein the aluminum welding alloy is substantially free of zirconium and exhibits a welding efficiency of about 82% or greater.

2. The aluminum welding alloy of claim 1, wherein the surface active elements exhibit a lower vapor pressure than magnesium at a temperature of about 1000° C. to about 1600° C.

3. The aluminum welding alloy of claim 1, wherein the surface active elements comprise calcium and strontium.

4. The aluminum welding alloy of claim 1 comprises about 0.01% to about 0.5%, by weight, of the surface active elements.

5. The aluminum welding alloy of claim 4, wherein the surface active elements consist of calcium.

6. The aluminum welding alloy of claim 1, wherein the arc stabilizer elements are selected from one or more metals of the lanthanide series exhibiting a lower first ionization potential than aluminum.

7. The aluminum welding alloy of claim 1, wherein the arc stabilizer elements comprise one or more of cerium and lanthanum.

8. The aluminum welding alloy of claim 1 comprises about 0.01% to about 1%, by weight, of the arc stabilizer elements.

9. The aluminum welding alloy of claim 1 comprises:
    about 0.01% to about 0.50%, by weight, of the surface active elements; and
    about 0.01% to about 1.0%, by weight, of the arc stabilizer elements.

10. The aluminum welding alloy of claim 1 comprises, by weight:
    about 0.05% to about 0.3% manganese;
    about 3.1% to 4.7% magnesium;
    about 0.1% or less, zinc;
    about 0.25% or less, silicon;
    about 0.4% or less, iron;
    about 0.2% or less, copper; and
    one or more of:
        about 0.01%, to about 0.1% by weight, calcium;
        about 0.01% to about 0.5%, by weight, strontium; and
        0.01% to about 1% of one or more of cerium and lanthanum.

11. The aluminum welding alloy of claim 1 is one or more of a 5000-series aluminum alloy as standardized by the Accrediting Standards Committee H35 of the Aluminum-Association and a 5000-series aluminum alloy as standardized by the American Welding Society ("AWS") A5.10 (2017).

12. The aluminum welding alloy of claim 1 is an AA5356 aluminum alloy as standardized by the Accrediting Standards Committee H35 of the Aluminum-Association or an ER5554 aluminum alloy as standard by the American Welding Society ("AWS") A5.10 (2017).

13. A welding wire or welding electrode formed of the aluminum welding alloy of claim 1.

* * * * *